UNITED STATES PATENT OFFICE.

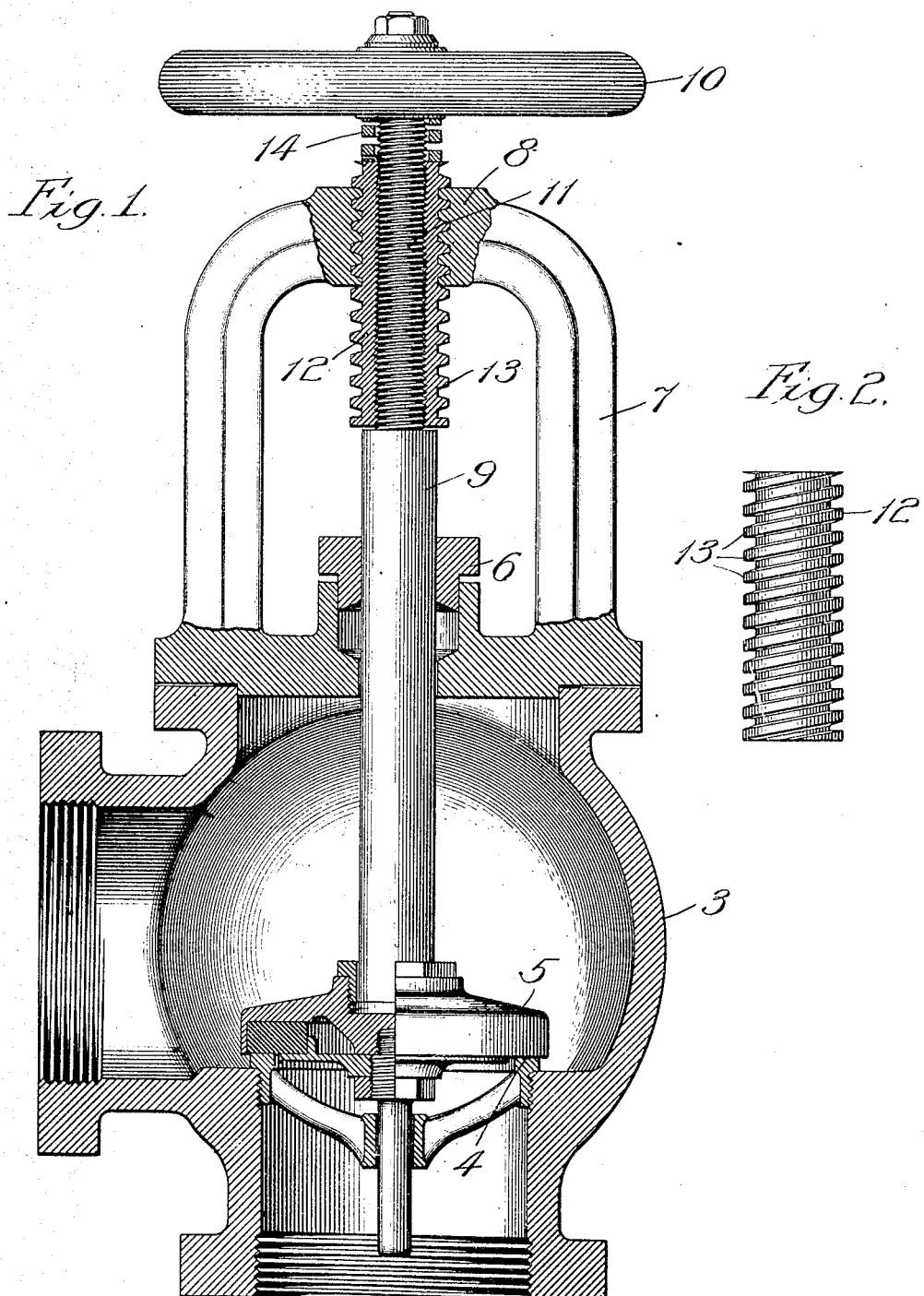

CHARLES KROESCHELL, OF CHICAGO, ILLINOIS, ASSIGNOR TO KROESCHELL BROTHERS COMPANY, OF CHICAGO, ILLINOIS, A CORPORATION OF ILLINOIS.

VALVE DEVICE.

No. 913,960.   Specification of Letters Patent.   Patented March 2, 1909.

Application filed May 28, 1908. Serial No. 435,420.

*To all whom it may concern:*

Be it known that I, CHARLES KROESCHELL, a citizen of the United States, residing at Chicago, in the county of Cook and State of Illinois, have invented a new and useful Improvement in Valve Devices, of which the following is a specification.

The object of my invention is to so adapt the differential screw for working the rotatable stem of a valve-device as to enable the valve, especially when of large size and in cases of emergency, to be quickly brought to its seat to be thereafter tightened against the same for closure of the valve under a slower action of the screw, or loosened upon its seat by such slow action preparatory to being quickly opened.

In the accompanying drawing, Figure 1 is a view of my improved valve-device in partly broken and sectional elevation, and Fig. 2 shows the threaded sleeve of the differential screw by a view in elevation.

The valve-casing 3 containing the seat 4 for the valve 5 and provided with a stuffing-box 6 through which the stem works, may be of usual or any desired construction. A yoke 7 extends from the casing and is provided in its crown-portion with a bearing 8 coarsely threaded internally. The valve-stem 9, which passes through the yoke-crown and carries a hand-wheel 10 on its outer end, is provided with a finely-threaded reduced section 11 working in a sleeve 12 which is correspondingly threaded internally and formed with a coarse external screw-thread 13 corresponding to that in the bearing 8 in which the sleeve works.

The feature of my invention is an adequately stiff coiled spring 14 confined endwise about the stem 9 between the wheel 10 and adjacent end of the sleeve to bind the latter to the threaded section of the stem with sufficient force to cause the sleeve to turn with the stem in operating it to bring the valve to and withdraw it from its seat, but with insufficient force to resist independent turning of the stem in tightening the valve upon its seat after bringing it thereto, or loosening it upon its seat preparatory to withdrawing it therefrom. In turning the stem to close the valve, therefore, the yielding union produced by the spring of the sleeve and stem-section 13 causes the coarse thread of the sleeve to quickly advance the valve against its seat until the resistance to tightly seating the valve overcomes the spring-pressure, when further turning of the stem will actuate it inside the sleeve, leaving the latter stationary, to effect tightening of the valve. In the reverse turning of the stem to open the valve, the initial resistance to opening the latter overcomes the union due to the spring-pressure, and causes the fine thread on the stem to work in the sleeve until the valve is loosened from its seat, after which the resistance to withdrawing the valve for fully opening it will be so far lessened as to be inferior to the aforesaid uniting pressure of the spring and cause continued turning of the stem to turn with it the sleeve and work its coarse exterior thread in the bearing 8 to quickly open the valve.

I claim:

A valve-device comprising, in combination, a casing containing a valve-seat and provided with an exterior sleeve-bearing having an internal coarse screw-thread, a valve in the casing provided with a rotatable stem having a reduced section with a fine screw-thread upon it and extending through said bearing, a handle on the outer end of the stem, a sleeve about said reduced stem-section having a fine internal screw-thread engaging with that on the stem and a coarse external screw-thread working in said bearing, and a coiled spring confined about the stem between said wheel and sleeve and forming a yielding union between the stem and sleeve, for the purpose set forth.

CHARLES KROESCHELL.

In presence of—
 RALPH SCHAEFER,
 CHAS. E. GAYLORD.